United States Patent [19]

Sadatoshi et al.

[11] Patent Number: 5,654,372
[45] Date of Patent: Aug. 5, 1997

[54] POLYPROPYLENE COMPOSITION AND THE FILM THEREOF

[75] Inventors: Hajime Sadatoshi; Seiichiro Ima; Kazuki Wakamatsu, all of Chiba, Japan; Jiro Mori, Singapore, Singapore; Eisuke Shiratani, Chiba, Japan

[73] Assignee: Sumitomo Chemical Company Limited, Osaka, Japan

[21] Appl. No.: 611,759

[22] Filed: Mar. 8, 1996

Related U.S. Application Data

[63] Continuation-in-part of Ser. No. 120,453, Sep. 14, 1993, abandoned.

[30] Foreign Application Priority Data

Sep. 16, 1992 [JP] Japan .................................. 4-246159
Sep. 16, 1992 [JP] Japan .................................. 4-246160

[51] Int. Cl.$^6$ ................................................ C08F 297/08
[52] U.S. Cl. ................................................ 525/323; 525/322
[58] Field of Search ................................ 525/323, 270, 525/88

[56] References Cited

U.S. PATENT DOCUMENTS 5,055,528 10/1991 Kioka et al. .

*Primary Examiner*—Joseph L. Schofer
*Assistant Examiner*—N. Sarofim
*Attorney, Agent, or Firm*—Sughrue, Mion, Zinn, Macpeak & Seas

[57] ABSTRACT

A polypropylene composition comprising a melt-kneaded polyprolylene composition obtained, using Zieglar-Natta catalyst, by polymerizing a monomer comprising propylene to form a polymer comprising polypropylene (component A) in amount of from 60 to 80% by weight to the total polymer amount in substantially the absence of an inert solvent in a 1st step and then polymerizing a mixture of ethylene content of from 20 to 50% by weight (component B) in a vapor phase to form an ethylene-propylene copolymer (component B) in amount of from 20 to 40% by weight to the total polymer amount in a 2nd step, said polypropylene composition being such that the intrinsic viscosity of component B ($[\eta]B$) is at least 2.0 dl/g and the ratio ($[\eta]B/[\eta]A$) of the intrinsic viscosity of the component B to the intrinsic viscosity of the component A ($[\eta]A$) is 1.8 or less and the melt flow rate of the polypropylene composition after melt-kneaded being 0.5 to 10 g/10 minutes.

12 Claims, No Drawings

POLYPROPYLENE COMPOSITION AND THE FILM THEREOF

CROSS REFERENCE TO THE RELATED APPLICATION

This application is a continuation-in-part application of U.S. patent application Ser. No. 08/120,453 filed Sep. 14, 1993, entitled "POLYPROPYLENE BLOCK COPOLYMER AND THE FILM THEREOF", which is now abandoned.

FIELD OF THE INVENTION

The present invention relates to a polypropylene composition and the film thereof. More specifically, the invention relates to a polypropylene composition and the film thereof each causing no fish eyes, etc., having a good appearance, and having excellent impact resistance at low temperature, heat resistance, and blocking resistance.

BACKGROUND OF THE INVENTION

Since a polypropylene film has excellent appearance, mechanical properties, packaging suitability, etc., the film is widely used in packaging fields such as food packaging, fiber packaging, etc.

Unstretched polypropylene films each comprising a propylene homopolymer, a random copolymer of propylene and an α-olefin, or a polypropylene composition obtained by 2-steps polymerization are used for various packaging uses by utilizing the features of each of the propylene homopolymer, the random polymer of propylene and α-olefin, and the polypropylene composition but conventional unstretched polypropylene films are insufficient in at least one of the appearance, the impact resistance at low temperature, the heat resistance, the blocking resistance, etc., according to the polymer or the copolymer used for each film. Hence the use of each film is restricted respectively.

That is, the film comprising the propylene homopolymer may have excellent appearance, heat resistance, and blocking resistance but is poor in the impact resistance at low temperature; the film comprising the random copolymer of propylene and α-olefin is poor in the appearance, the impact resistance at low temperature, and the heat resistance; and the film comprising the polypropylene composition may have excellent impact resistance at low temperature to some extent but is poor in the appearance due to the occurrence of fish eyes or poor in the blocking resistance. As described above, each film is restricted on each use.

Furthermore, to improve the above-described characteristics, it is attempted to compound the propylene polymer or copolymer with low crystalline EPR (ethylene propylene rubber) but this attempt is not yet sufficient in the impact resistance at low temperature and the heat resistance.

Thus, the development of a polypropylene film having excellent appearance, impact resistance at low temperature, heat resistance, blocking resistance, etc., has been desired.

Accordingly, various attempts have been made to improve the above-described characteristics by, for example, using mainly a polypropylene composition obtained by 2-steps polymerization method (sometimes referred to as polypropylene block copolymer).

JP-B-58-10414 (the term "JP-B" as used herein means an "examined published Japanese patent application") discloses a continuous production process of a polypropylene block copolymer, wherein the ratio of the intrinsic viscosity of the 2nd polymerizing portion to the intrinsic viscosity of the 1st polymerizing portion is adjusted in the range of from 1 to 1.2, and practically describes a polymer polymerized by a solvent polymerization method. A film having no occurrence of fish eyes, and having good appearance, heat resistance and blocking resistance is obtained by this process but the film is insufficient in the impact resistance at low temperature.

JP-A-56-84712 (the term "JP-A" as used herein means an "unexamined published Japanese patent application") discloses a polypropylene block copolymer having the features that the melt flow index is from 0.01 to 0.3 g/10 minutes, which is suitable for an air-cooling inflation molding method, the ethylene content of the portion A is less than 20% by weight, the ethylene content of the portion B is at least 20% by weight, etc., and practically describes a polymer polymerized by a solvent method. However, the copolymer thus obtained is insufficient in the points of the workability and the impact resistance at low temperature.

JP-A-59-115312 and JP-A-59-74109 disclose a production process of a polymer composition for a retort film and a film for a retort food packaging bag. However, the polymer composition wherein the 1st stage melting point is in the range of from 132° to 155° C. is poor in the heat resistance and is also insufficient in the impact resistance at low temperature. Further, the polymer composition wherein the 1st stage melting point is 159.6° C. is insufficient in the impact resistance at low temperature.

JP-A-1-225648 describes a composition of a propylene copolymer, wherein the intrinsic viscosity of the B component is 1.92 dl/g or less, polymerized by a solvent polymerization method. However, this composition is poor in the impact resistance at low temperature and the blocking resistance or is poor in the appearance caused by the occurrence of fish eyes or in the workability.

The inventors made investigations to develop a polypropylene composition obtained by 2-steps polymerization method and the film thereof having a good impact resistance at low temperature, a good appearance and a good blocking resistance without losing the preferred characteristics such as heat resistance, etc., which the polypropylene copolymer inherently has, by overcoming the above-described disadvantages of conventional propylene copolymers.

However, by the conventional solvent polymerization method and bulk polymerization, an ethylene-propylene copolymer portion, which is a component effective for the impact resistance at low temperature, is dissolved in a solvent or a liquid monomer, whereby the copolymer obtained is insufficient in the point of the impact resistance at low temperature and thus it is difficult to attain the object described above.

SUMMARY OF THE INVENTION

As a result of various investigations, it has been found that the above-described object can be attained by melt-kneading a specific composition obtained by polymerizing in substantially the absence of a solvent and by melt-extruding the polypropylene composition to form a film thereof. The present invention has been attained based on this finding.

Accordingly, one object of the present invention is to provide a polypropylene composition comprising a melt-kneaded polypropylene composition which is obtained by polymerizing, in the first step, monomer comprising propylene in the presence of a Ziegler-Natta catalyst and in the absence of a solvent to give a polymer comprising polypropylene (component A) in an amount of from 60 to 80% by weight of the total amount of the polypropylene composition and then, in the second step, a mixture of ethylene and propylene in a vapor phase to give an ethylene-propylene copolymer (component B) having the ethylene content of from 20 to 50% by weight in an amount of 20 to 40% by weight of the total amount of the polypropylene composition and melt-kneading the resulting polypropylene composition, wherein the intrinsic viscosity of component B ($[\eta]B$) is at least 2.0 dl/g and the ratio ($[\eta]B/[\eta]A$) of the intrinsic viscosity of the component B ($[\eta]B$) to the intrinsic viscosity of the component A ($[\eta]A$) is 1.8 or less.

Another object of the present invention is to provide a film formed by melt-extruding the polypropylene composition.

DETAILED DESCRIPTION OF THE INVENTION

The present invention is described in detail below.

The polypropylene composition of the present invention is a melt-kneaded polypropylene composition which is obtained by polymerizing monomer comprising propylene in substantially the absence of a solvent in the presence of a Ziegler-Natta catalyst and then ethylene-propylene in a vapor phase.

In this case, it is necessary for the ratio of the polymer comprising propylene (component A) and the ethylene-propylene copolymer (component B) that the proportion of the component A is in the range of from 60 to 80% by weight and the proportion of the component B is in the range of from 20 to 40% by weight.

If the proportion of the component B is less than 20% by weight, the impact resistance at low temperature is reduced, while if the proportion of the component B is over 40% by weight, there is a problem that a trouble occurs with the polymerization and greatly reduces the productivity or that the heat resistance of the polypropylene composition obtained is reduced.

From the point of the impact resistance at low temperature, it is preferred for the ratio of the component A and the component B that the proportion of the component A is in the range of from 60 to 75% by weight and the proportion of the component B is in the range of from 25 to 40% by weight.

The component A is preferably a propylene homopolymer having a melting point of at least 160° C. from the points of the heat resistance and the rigidity but as far as the component A has a melting point of 157° C. or higher, the polymer may be a copolymer of propylene and a small amount of an α-olefin other than propylene, such as ethylene, butene-1, etc.

It is necessary for the ethylene-propylene copolymer (component B) that the ethylene content is from 20 to 50% by weight and the intrinsic viscosity ($[\eta]B$) is at least 2.0 dl/g.

If the ethylene content is less than 20% by weight, the impact resistance at low temperature is decreased, while if the ethylene content is over 50% by weight, the appearance and the impact resistance at low temperature of the film are poor and, on the other hand, if $[\eta]B$ is less than 2.0 dl/g, the blocking resistance and the impact resistance at low temperature are poor. Thus, in these cases the object of the present invention cannot be attained.

The ethylene content of the component B is preferably in the range of from 25 to 45% by weight from the points of the appearance and the impact resistance. Also, $[\eta]B$ is preferably at least 2.5 dl/g, and more preferably in the range of from 2.5 to 4.5 dl/g.

Furthermore, it is necessary that the ratio ($[\eta]B/[\eta]A$) of the intrinsic viscosity of the component B to the intrinsic viscosity of the component A is 1.8 or less. If the ratio $[\eta]B/[\eta]A$ is over 1.8, the appearance of the film is decreased due to the occurrence of fish eyes, whereby the film cannot be used for commercial purpose.

The ratio $[\eta]B/[\eta]A$ is preferably in the range of from 0.8 to 1.7 from the points of the impact resistance at low temperature and the appearance.

The polypropylene composition of the present invention is obtained by melt-kneading the composition described above.

The melt flow rate of the polypropylene composition after melt-kneading is from 0.5 to 10 g/10 minutes, and preferably from 1.0 to 5.0 g/10 minutes from the points of the high-speed film-formation stability, the appearance, etc.

The process for obtaining the polypropylene composition having a melt flow rate of from 0.5 to 10 g/10 minutes from the composition defined in the present invention is not particularly limited so long as a process of conducting melt-kneading by the conventional method in the presence or absence of an organic peroxide can be employed.

In the polypropylene composition of the present invention, the content of 20° C. xylene-soluble components is preferably from 10 to 30% by weight, and more preferably from 10 to 25% by weight from the points of the impact resistance at low temperature, the heat resistance, and the solvent resistance.

It is necessary for the food packaging film that the content of the component (L-CXS) having a molecular weight of 50,000 or less in the 20° C. xylene-soluble components in the polypropylene composition after melt-kneading is 2.0% by weight or less. If the content of L-CXS in the total polymer is over 2.0% by weight, the hexane extracted amount which is an important factor for food hygiene, is increased.

The polypropylene composition of the present invention can be produced, using a Ziegler-Natta catalyst, by a batch type polymerization method comprising polymerizing the monomer comprising propylene in a polymerization reactor and successively polymerizing ethylene-propylene in the same polymerization reactor or a continuous polymerization method comprising continuously polymerizing the monomer comprising propylene and ethylene-propylene using at least 2 polymerization reactors.

Practically, for example, the polypropylene composition can be produced by polymerizing the monomer comprising propylene to form the polymer comprising propylene (component A) while supplying propylene and hydrogen for controlling the molecular weight in substantially the absence of an inert solvent in the 1st step and successively polymerizing ethylene-propylene to form the ethylene-propylene copolymer (component B) while supplying propylene, ethylene, and hydrogen in a vapor phase in the 2nd step, using a Ziegler-Natta catalyst containing at least titanium, magnesium and a halogen as the essential components, such as a catalyst system comprising (a) a trivalent titanium compound-containing solid catalyst component obtained by reducing a titanium compound represented by the formula $Ti(OR^1)_nX_{4-n}$ (wherein $R^1$ represents a hydrocarbon group having from 1 to 20 carbon atoms; X represents a halogen atom; and n represents a number of $0<n \leq 4$) with an organic magnesium compound in the co-presence of an organosilicon compound having a Si—O bond to obtain a solid product and treating the solid product thus obtained with an ester compound and a mixture of an ether compound and titanium tetrachloride, (b) an organoaluminum compound, and (c) a silicon compound having a Si-OR$^2$ bond (wherein R$^2$ represents a hydrocarbon group having from 1 to 20 carbon atoms), or a catalyst system comprising (a') a hydrocarbyloxy group-containing catalyst component obtained by reducing a titanium compound represented by the formula Ti(OR$^1$)$_n$X$_{4-n}$ (wherein R$^1$ represents a hydrocarbon group having from 1 to 20 carbon atoms; X represents a halogen atom; and n represents a number of 0<n≦4) with an organoaluminum compound represented by the formula AlR$^2{}_m$Y3-m (wherein R$^2$ represents a hydrocarbon group having from 1 to 20 carbon atoms; Y represents a halogen atom; and m represents a number of 1≦m≦3) to obtain a solid product which is insoluble in a hydrocarbon solvent and having a hydrocarbyloxy group, and after prepolymerization treatment of the solid product with ethylene, treating the same in a slurry state in the presence of an ether compound and titanium tetrachloride in a hydrocarbon solvent at a temperature of from 80° C. to 100° C., and (b) an organic aluminum compound, in a manner such that the molar ratio of the Al atom in the component (b) to the Ti atom in the component (a) (Al/Ti) becomes from 1 to 2,000, and preferably from 5 to 1,500 and the molar ratio of the component (c) to the Al atom in the component (b) becomes from 0.02 to 500, and preferably from 0.05 to 50, under the conditions of a polymerization temperature of from 20° to 150° C., and preferably from 50° to 95° C. and a polymerization pressure of from the atmospheric pressure to 40 kg/cm$^2$ G, and preferably from 2 to 40 kg/cm$^2$ G.

The polypropylene composition film of the present invention can be produced by the conventional film-forming method such as a T-die method, a tubular method, etc., but is particularly preferably produced by a production process of an unstretched film by a T-die method.

There is no particular restriction on the thickness of the polypropylene composition film of the present invention, but the thickness of the film is preferably from 10 to 500 μm, and more preferably from 10 to 100 μm.

Since the polypropylene composition film of the present invention has excellent appearance, impact resistance at low temperature, blocking resistance, and heat resistance, the film is particularly preferable for the use of packaging heavy materials at low temperature.

Also, the film of the present invention can be suitably used as at least one layer of a composite film with other film such as a polypropylene biaxially stretched film, an unstretched nylon film, a stretched polyethyl terephthalate film, an aluminum foil, etc., produced by a dry lamination method, an extrusion lamination method, etc.

The polypropylene composition film of the present invention can be subjected to a surface treatment by a method usually industrially employed, such as a corona discharging treatment method, a flame treatment method, a plasma treatment method, an ozone treatment method, etc.

The polypropylene composition of the present invention and the film thereof may, if necessary, contain an antioxidant, an ultraviolet absorber, an antistatic agent, antifogging agent, a lubricant, an anti-blocking agent, a nucleating agent, etc.

The present invention is described in more detail by the following examples but the scope of the present invention is not limited to those examples.

In addition, the measurement value of each item in the specification including the examples was measured by the following method.

(1) Contents of Component A and Component B

From the material balance of the polymerization, the content (PA) of the component A and the content (PB) of the component B were determined.

(2) Intrinsic Viscosity ([η])

Measured in tetralin at 135° C. using a Ubbellohde's viscometer.

Intrinsic viscosities of the component A and the component B ([η]A, [η]B)

From the intrinsic viscosity [η]A of the component A measured after completion of the polymerization in the 1st step, the intrinsic viscosity [η]AB measured after completion of the polymerization in the 2nd step, the content (PA) of the component A, and the content (PB) of the component B, the intrinsic viscosity [η]B of the component B was determined by the following equation;

$$[\eta]A \times PA/100 + [\eta]B \times PB/100 = [\eta]AB$$

(3) Ethylene Content

Determined by IR spectral method according to the method described in *Kobunshi Bunseki (Macromolecular Analysis) Handbook*, pages 256–257, "(ii) Block Copolymer", published by Asakura Shoten, 1985.

(4) Melt Flow Rate (MFR)

Measured by the method of Condition-14 according to JIS K7210.

(5) content of 20° C. Xylene-Soluble Components (CXS)

After completely dissolving 5 g of polypropylene in 500 ml of boiling xylene, the temperature was lowered to 20° C. and the solution was allowed to stand for at least 4 hours. Precipitates formed were filtered off and the filtrate obtained was evaporated to dryness and dried at 70° C. under a reduced pressure. The weight thereof was measured to determine the content (weight %).

(6) Amount of Component (L-CXS) Having Molecular Weight of 50,000 or less of the 20° C. Xylene-Soluble Component (CXS)

The 20° C. xylene-soluble component was sampled, and the sample was measured by gel permeation chromatography (GPC) to obtain the molecular weight distribution graph. The content (W) of the components having a molecular weight of 50,000 or less (converted as polystyrene) was obtained from the graph, and L-CXS was determined by the following equation;

$$L\text{-}CXS = \text{Total CXS Contents} \times W$$

GPC Measurement Condition

By a gel permeation chromatography (GPC), the molecular weight was measured under the following conditions. Also, the calibration curve was made using standard polystyrene.

Apparatus: Type 150CV, manufactured by Millipore Waters Co.
Column: Shodex M/S 80
Measurement Temperature: 145° C.
Solvent: o-Dichlorobenzene
Sample Concentration: 5 mg/8 ml In addition, when Standard Reference Material 706 (polystyrene of Mw/Mn=2.1) of NBS (National Bureau of Standards) was measured under the above conditions, the molecular weight distribution (Mw/Mn=2.1) was obtained.

(7) Melting Point (Tm)

After previously melting 10 mg of a test piece at 220° C. for 5 minutes under a nitrogen gas atmosphere using a differential scanning calorimeter (DSC, trade name, manufactured by Perkin-Elmer Co.), the temperature was decreased to 40° C. at a temperature-decreasing rate of 5° C./minute.

Thereafter, the temperature was raised at a temperature-raising rate of 5° C./minute, and the peak temperature of the maximum peak of the molten endothermic curve obtained was defined as the melting point (Tm).

In addition, the melting point of indium (In) measured by using the above measurement apparatus at a temperature-rasing rate of 5° C./minutes was 156.6° C.

Film Characteristics

Measured on each film having a thickness of 30 µm by the following methods.

(8) Appearance

Fish eyes (FE) having a diameter of at least 200 µm were visually observed on each sample film, a film wherein the number of FE was about 10/1000 cm$^2$ or less was defined as good, and a film wherein the number of WF was about 15/1000 cm$^2$ or more was defined as bad.

(9) Impact Resistance

The impact strength of each film was measured at −10° C. using a hemispherical impact head having a diameter of 15 mm by a film impact tester manufactured by Toyo Seiki Seisaku-sho, LTD.,

(10) Blocking Resistance

Films each having an area of 225 mm×50 mm were superposed each other and under loading the range thereof of 100 mm×50 mm with 40 g/cm$^2$, the state control was carried out for 3 hours at 60° C. Thereafter, the assembly was allowed to stand under the atmosphere of 23° C. and 50% in humidity for at least 30 minutes and the strength required to peel the sample films each other was measured at a peeling load rate of 20 g/minutes using a blocking tester manufactured by Shimazu Corporation.

(11) Heat Sealing Temperature

Films were superposed each other and heat sealed by press-adhering for 2 seconds at a load of 2 kg/cm$^2$ G using a heat sealer (manufactured by Toyo Seiki Seisaku-sho, LTD.) heated to a definite temperature. After allowing to stand them overnight, the sealing temperature at which the peeling resisting force when they were peeled each other at 23° C., a peeling rate of 200 mm/minute, and a peeling angle of 180° became 300 g/mm was obtained and the temperature was defined as the heat sealing temperature.

Food Hygiene

Measured each film having a thickness of 60 µm by the following methods.

(12) Hexane Extracted Amount

The n-hexane extracted amount of the film having a thickness of 60 µm at 50° C. was measured according to the method described in FDA 177. 1520 (d) (3) (ii). In addition, the regulated value of the hexane extracted amount in the case of using the film for retort food packaging is 2.6% by weight or less.

(13) Xylene-Soluble Component

The amount of the xylene-soluble component at 25° C. was measured according to the method described in FDA 177. 1520 (d) (4). In addition, the regulated value of the content of the xylene-soluble component in the case of using the film for food packaging is 30% by weight or less.

REFERENCE EXAMPLE (a) Synthesis of Organomagnesium Compound

After displacing the inside atmosphere of a one liter flask equipped with a stirrer, a reflux condenser, a dropping funnel, and a thermometer with argon, 32.0 g of scraped magnesium for a Grignard reagent was placed in the flask. In the dropping funnel were charged 120 g of butyl chloride and 500 ml of di-butyl ether and about 30 ml of the mixture in the dropping funnel was added dropwise to magnesium in the flask to initiate the reaction. After the initiation of the reaction, the mixture in the dropping funnel was added dropwise to the mixture in the flask at 50° C. over a period of 4 hours and after completion of the addition thereof, the reaction was further continued at 60° C. for one hour. The reaction mixture obtained was cooled to room temperature and the solid matters thus formed were filtered off.

When butyl magnesium chloride in dibutyl ether recovered as the filtrate was hydrolyzed with 1N sulfuric acid and the concentration thereof was determined by back titrating with an aqueous solution of 1N sodium hydroxide using phenol-phthalein as an indicator, the concentration was 2.1 mol/liter.

(b) Synthesis of Solid Product

After displacing the inside atmosphere of a 500 ml flask equipped with a stirrer and a dropping funnel with argon, 240 ml of hexane, 5.4 g (15.8 mmols) of tetrabutoxytitanium, and 61.4 g (295 mmols) of tetraethoxysilane were placed in the flask to form a homogeneous solution. 150 ml of the organomagnesium compound synthesized in (a) described above was then gradually added dropwise to the solution from the dropping funnel over a period of 4 hours while maintaining the inside temperature of the flask at 5° C. After further stirring the reaction mixture for one hour at room temperature, solid product formed was separated from the liquid phase, repeatedly washed 3 times with 240 ml of hexane, and dried under a reduced pressure to obtain 45.0 g of a light brown solid product.

The solid product obtained contained 1.7% by weight of a titanium atom, 33.8% by weight of an ethoxy group, and 2.9% by weight of a butoxy group.

Also, in the wide angle X-ray diffraction pattern of the solid product by a Cu-Kα ray, no clear diffraction peaks were observed, which showed the solid product having a non-crystalline structure.

(c) Synthesis of Ester-Treated Solid

After displacing the inside atmosphere of a 100 ml flask with argon, 6.5 g of the solid product synthesized in (b) described above, 16.2 ml of toluene, and 4.3 ml (16 mmols) of diisobutyl phthalate were placed in the flask and the reaction was conducted at 95° C. for one hour. After the reaction was over, the solid product formed was separated from the liquid phase and washed 3 times with 33 ml of toluene.

(d) Synthesis of Solid Catalyst (Activation Treatment)

After washing the solid product in above (c), 16.1 ml of toluene, 0.36 ml (1.3 mmols) of diisobutyl phthalate, 2.2 ml (13 mmols) of butyl ether, and 38.0 ml (346 mmols) of titanium tetrachloride were added to the solid product in the flask and the reaction was conducted at 95° C. for 3 hours. After the reaction was over, solid product formed was separated from the liquid phase at 95° C. and washed twice with 33 ml of toluene at the same temperature as above. The treatment with the mixture of diiobutyl phthalate, butyl ether, and titanium tetrachloride described above was further repeated once more under the same condition and the product was washed 3 times with 33 ml of hexane to obtain 5.0 g of a yellow ocher color solid catalyst.

The solid catalyst contained 2.1% by weight of a titanium atom, 19.9% by weight of a magnesium atom, and 12.7% by weight of a phthalic acid ester.

EXAMPLE 1

(a) Catalyst Component

To a 250 liter reaction vessel equipped with a stirrer was placed 150 liters of sufficiently purified hexane and after sufficiently displacing the inside atmosphere of the system with nitrogen, 3.2 mols of triethylaluminum (TEA), 0.32 mol of cyclohexylethyldimethoxysilane (CHEDMS), and 51.8 g (converted as Ti atom) of the solid catalyst obtained in the Reference Example described above were added to hexane in the reaction vessel. 2.8 kg of propylene was then continuously added to the mixture at 25° C. over a period of 2 hours.

(b) Polymerization

An apparatus comprising three vapor phase polymerization reactors connected in series, each having an inner volume of 20–45 m$^3$, was used. Three reactors are represented by X, Y and Z. Homopolymerization of propylene was conducted in X and Y reactors. Polymerization pressure was 20 kg/cm$^2$G in X reactor and 17 kg/cm$^2$G in Y reactor, and polymerization temperature was 80° C. in X and Y reactors. Reaction time was controlled such that an average retention time of sum of X and Y reactors became 7 hours by continuously supplying the catalyst component prepared in (a) above to X reactor. At the same time, TEA and CHEDMS were supplied in amounts of 2 mol/hr and 0.3 mol/hr, respectively, and H$_2$ was continuously supplied such that the H$_2$ concentration in X and Y reactors was 0.01%.

The polymer discharged from Y reactor was transferred into Z reactor, and propylene and ethylene were polymerized at a temperature of 70° C. under a pressure of 14 kg/cm$^2$G and in a retention time of 3 hours. Ethylene, propylene and H$_2$ were supplied such that the ethylene concentration was 25% and the H$_2$ concentration was 0.5%.

In the polypropylene composition obtained, the content of component A was 73% by weight, the intrinsic viscosity of component A ([η]A) was 3.0 dl/g, the content of component B was 27% by weight, the content of ethylene was 34% by weight, the intrinsic viscosity ([η]B) was 3.4 dl/g, and [η]B/[η]A was 1.1.

To 100 parts by weight of the composition powder were added 0.1 part by weight of calcium stearate, 0.2 part by weight of Sumilizer BHT (trade name, made by Sumitomo Chemical Company, Limited), 0.1 part by weight of Irganox 1010 (trade name, made by Ciba-Geigy AG) and 0.02 part by weight of 2,5-dimethyl- 2,5-di(tert-butylperoxy)hexane. After mixing the resulting mixture with Henschel mixer, pellets were formed by melt-extruding. In the pellets, the melt flow rate was 2.5 g/10 min, the content of 20° C. xylene-soluble component was 17.0% by weight, and the melting point was 163° C.

The pellets obtained were melt-extruded with a T-die film formation machine (diameter: 50 mm) at a die temperature of 280° C. and cooled with cooling rolls having passed therethrough 30° C. water to obtain an unstretched film having a thickness of 30 μm. The appearance, impact strength and blocking resistance of the film obtained were evaluated. The evaluation results are shown in Table 1 below.

TABLE 1

| | Polypropylene Compsition | | | | |
| --- | --- | --- | --- | --- | --- |
| | Propylene polymer | | Ethylene-propylene copolymer | | |
| | | | | Ethylene | |
| | Content (wt %) | [η]A (dl/g) | Content (wt %) | content (wt %) | [η]B (dl/g) |
| Example 1 | 73 | 3.0 | 27 | 34 | 3.4 |
| Example 2 | 66 | 2.0 | 34 | 31 | 3.4 |
| Example 3 | 69 | 2.4 | 31 | 40 | 3.7 |
| Example 4 | 72 | 3.1 | 28 | 34 | 2.9 |
| Example 5 | 71 | 2.9 | 29 | 34 | 3.3 |
| Example 6 | 64 | 3.0 | 36 | 36 | 3.5 |
| Comparative Example 1 | 74 | 3.1 | 26 | 32 | 3.1 |
| Comparative Example 2 | 85 | 2.3 | 15 | 42 | 4.7 |
| Comparative Example 3 | 72 | 3.2 | 28 | 15 | 2.6 |
| Comparative Example 4 | 63 | 3.2 | 37 | 58 | 4.0 |
| Comparative Example 5 | 75 | 2.3 | 25 | 25 | 1.0 |
| Comparative Example 6 | 67 | 2.9 | 33 | 32 | 3.6 |

| | Properties of Polypropylene composition | | | 20° C. Xylene-Soluble Components Content of components having molecular |
| --- | --- | --- | --- | --- |
| | [η]B/[η]A | MFR (g/10 min) | Total content (wt %) | weight of 50,000 or less (wt %) |
| Example 1 | 1.1 | 2.5 | 17.0 | — |
| Example 2 | 1.7 | 2.5 | 20.3 | — |
| Example 3 | 1.5 | 1.4 | 24.0 | 3.5 |
| Example 4 | 0.9 | 1.6 | 16.8 | 1.7 |
| Example 5 | 1.1 | 2.3 | 17.0 | 1.2 |
| Example 6 | 1.2 | 3.3 | 18.4 | 1.5 |
| Comparative Example 1 | 1.0 | 1.9 | 11.7 | 1.0 |
| Comparative Example 2 | 2.0 | 1.1 | 9.0 | 1.0 |
| Comparative Example 3 | 0.8 | 2.4 | 9.5 | 1.2 |
| Comparative Example 4 | 1.3 | 1.8 | 15.6 | 1.5 |
| Comparative Example 5 | 0.4 | 3.6 | 19.1 | 4.7 |
| Comparative Example 6 | 1.2 | 13 | 18.4 | 3.7 |

EXAMPLE 2

The same procedure as in Example 1 was followed except that in the polymerization steps, the concentration of H$_2$ in the 1st step and the concentrations of ethylene and H$_2$ and the polymerized amount in the 2nd step were changed.

On the pellets thus obtained, the proportion of the 20° C. xylene-soluble component was 20.3% by weight and the melting point thereof was 164° C.

Using the pellets, a film was formed and evaluated in the same manner as in Example 1. The evaluation results are shown in Table 2 below.

EXAMPLES 3 TO 6

The same procedure as in Example 1 was followed except that in the polymerization steps, the concentration of H$_2$ in the 1st step and the concentrations of ethylene and $H_2$ and the polymerized amount in the 2nd step were changed and after mixing and forming pellets, the same procedure as in Example 1 was followed except that the compounding amount of 2,5-dimethyl-2,5-di(tert-butylperoxy)hexane was changed.

The melting point of the pellets obtained in Examples 3 to 6 was 164° C.

Using each of the pellets thus obtained, a film was formed and evaluated as in Example 1. The evaluation results are shown in Table 2 below.

COMPARATIVE EXAMPLE 1

Using a polymerization reactor having an inside volume of 23 m² equipped with a stirrer, propylene was polymerized in the co-presence of the solid catalyst described in JP-B-3-46001, diethylaluminum chloride, an electron donor, and hydrogen, using heptane as a solvent, at a polymerization temperature of 60° C., a polymerization pressure of 9 kg/cm² G, and a gaseous phase hydrogen concentration of 1.5%. In succession, propylene and ethylene were polymerized in the same polymerization reactor for 3 hours at a polymerization temperature of 50° C. and a polymerization pressure of 5 kg/cm² G. Ethylene, propylene, and $H_2$ were supplied such that the ethylene concentration became 32%, and the $H_2$ concentration became 4.5% by weight.

In the composition obtained, the content of component A was 74% by weight, the intrinsic viscosity of component A ($[\eta]A$) was 3.1 dl/g, the content of component B was 26% by weight, the content of ethylene was 32% by weight, the intrinsic viscosity of component B ($[\eta]B$) was 3.1 dl/g, and $[\eta]B/[\eta]A$ was 1.0.

Using the composition, pellets were formed as in Example 1. In the pellets, the melt flow rate was 1.9 g/10 minutes and the content of the 20° C. xylene-soluble components was 11.7% by weight.

Using the pellets thus obtained, the film was formed and evaluated as in Example 1. The evaluation results are shown in Table 2.

COMPARATIVE EXAMPLES 2 TO 4

The same procedure as in Example 1 was followed except that in the polymerization steps, the concentration of $H_2$ in the 1st step and the concentrations of ethylene and $H_2$ and the polymerized amount in the 2nd step were changed and after mixing and forming pellets, the same procedure as in Example 1 was followed except that the compounding amount of 2,5-dimethyl-2,5-di(tert-butylperoxy)hexane was changed. The evaluation results are shown in Table 2 below.

COMPARATIVE EXAMPLE 5

After mixing 75 parts by weight of Sumitomo Noblen FS2011D ($[\eta]$=2.28 dl/g) (trade name, made by Sumitomo Chemical Company, Limited) and an ethylene-propylene copolymer having an ethylene content of 25% by weight and an intrinsic viscosity of 1.0 dl/g obtained by polymerizing a mixed gas of propylene and ethylene using a catalyst system comprising a combination of the $TiCl_3$ type solid catalyst described in JP-B-3-46001 and diethylaluminum chloride at an ethylene concentration of 28%, $H_2$ concentration of 23%, a polymerization temperature of 60° C. and a polymerization pressure of 3 kg/cm² the mixture was compounded with 0.05 part by weight of calcium stearate, 0.05 part by weight of Sumilizer BHT (trade name, made by Sumitomo Chemical Company, Limited), and 0.05 part by weight of Irganox 1010 (trade name, made by Ciba-Geigy AG) and pellets were formed from the resulting mixture.

In the pellets, the melt flow rate was 3.6 g/10 minutes and the content of the 20° C. xylene-soluble components was 19.1% by weight.

Using the pellets, a film was formed and evaluated as in Example 1. The evaluation results are shown in Table 2 below.

COMPARATIVE EXAMPLE 6

The same procedure as in Example 1 was followed except that in the polymerization steps, the concentration of $H_2$ in the 1st step and the concentrations of ethylene and $H_2$ and the polymerized amount in the 2nd step were changed. After mixing and forming pellets, the same procedure as in Example 1 was followed except that the compounding amount of 2,5-dimethyl-2,5-di(tert-butylperoxy)hexane was changed to 0.1 part by weight. The evaluation results are shown in Table 2 below.

TABLE 2

| | Film Properties | | | | | |
| --- | --- | --- | --- | --- | --- | --- |
| | | | | Food Hygiene | | |
| | Appearance | Impact strength (kg · cm/mm) | Blocking resistance (g/100 cm²) | Hexane extracted amount (wt %) | Xylene-soluble components (wt %) | Heat sealing temperature (°C.) |
| Example 1 | Good | 101 | 22 | 2.0 | — | — |
| Example 2 | " | 96 | 33 | 1.5 | 24 | 152 |
| Example 3 | " | 90 | 10 | 5.6 | — | — |
| Example 4 | " | 87 | 22 | 2.5 | 20.9 | 150 |
| Example 5 | " | 92 | 29 | 1.5 | 21.0 | 149 |
| Example 6 | " | 92 | 31 | 2.0 | 23.0 | 148 |
| Comparative Example 1 | " | 29 | 0 | 0.8 | — | — |
| Comparative Example 2 | Bad | 63 | 0 | 1.0 | — | — |
| Comparative Example 3 | Good | 18 | 58 | 1.3 | — | — |
| Comparative Example 4 | Bad | 65 | 18 | 1.9 | — | — |

TABLE 2-continued

| | | Film Properties | | | | |
| --- | --- | --- | --- | --- | --- | --- |
| | | | | Food Hygiene | | |
| | Appearance | Impact strength (kg · cm/mm) | Blocking resistance (g/100 cm$^2$) | Hexane extracted amount (wt %) | Xylene-soluble components (wt %) | Heat sealing temperature (°C.) |
| Comparative Example 5 | Good | 22 | more than 100 | 6.1 | — | — |
| Comparative Example 6 | Bad | 84 | 43 | 4.9 | — | — |

While the invention has been described in detail and with reference to specific embodiments thereof, it will be apparent to one skilled in the art that various changes and modifications can be made therein without departing from the spirit and scope thereof.

What is claimed is:

1. A polypropylene composition comprising a melt-kneaded polypropylene composition obtained, using Zieglar-Natta catalyst, by polymerizing a monomer comprising propylene to form a polymer comprising polypropylene (component A) in amount of from 60 to 80% by weight to the total polymer amount in substantially the absence of an inert solvent in a 1st step and then polymerizing a mixture of ethylene content of from 20 to 50% by weight (component B) in a vapor phase to form an ethylene-propylene copolymer (component B) in amount of from 20 to 40% by weight to the total polymer amount in a 2nd step, said polypropylene composition being such that the intrinsic viscosity of component B ([η]B) is at least 2.0 dl/g and the ratio ([η]B/[η]A) of the intrinsic viscosity of the component B to the intrinsic viscosity of the component A ([η]A) is 1.8 or less and the melt flow rate of the polypropylene composition after melt-kneaded being 0.5 to 10 g/10 minutes.

2. The polypropylene composition of claim 1, wherein the Zieglar-Natta catalyst contains at least titanium, magnesium, and a halogen as a essential components.

3. The polypropylene composition of claim 1, wherein the component A is a propylene homopolymer having a melting point of at least 160° C. or a copolymer of propylene and a small amount of an α-olefin other than propylene, having a melting point of 157° C. or higher.

4. The polypropylene composition of claim 1, wherein the melt flow rate of the polypropylene composition after melt-kneaded is 1.0 to 5.0 g/10 minutes.

5. The polypropylene composition of claim 1, wherein the ethylene content of the component B is in the range of 25 to 45% by weight.

6. The polypropylene composition of claim 1, wherein the intrinsic viscosity of component B ([η]B) is at least 2.5 dl/g.

7. The polypropylene composition of claim 6, wherein the intrinsic viscosity of component B ([η]B) is in the range of from 2.5 to 4.5 dl/g.

8. The polypropylene composition of claim 1, wherein amounts of the component A and component B are 60 to 75% and 25 to 40% by weight to the total polypropylene composition obtained by the polymerization, respectively.

9. The polypropylene composition of claim 1, wherein the ratio [η]B/[η]A is 0.8 to 1.7.

10. The polypropylene composition of claim 1, wherein the content of components having a molecular weight of 50,000 or less in the 20° C. xylene soluble components in the total polymer after melt-kneaded is 2.0% by weight or less.

11. A film prepared from the propylene composition as claimed in claim 1.

12. The film of claim 11, wherein the thickness of the film is 10 to 500μ.

* * * * *